Jan. 22, 1963
C. V. JONES, SR
3,074,254
RESILIENT SHAFT COUPLING
Filed June 8, 1961
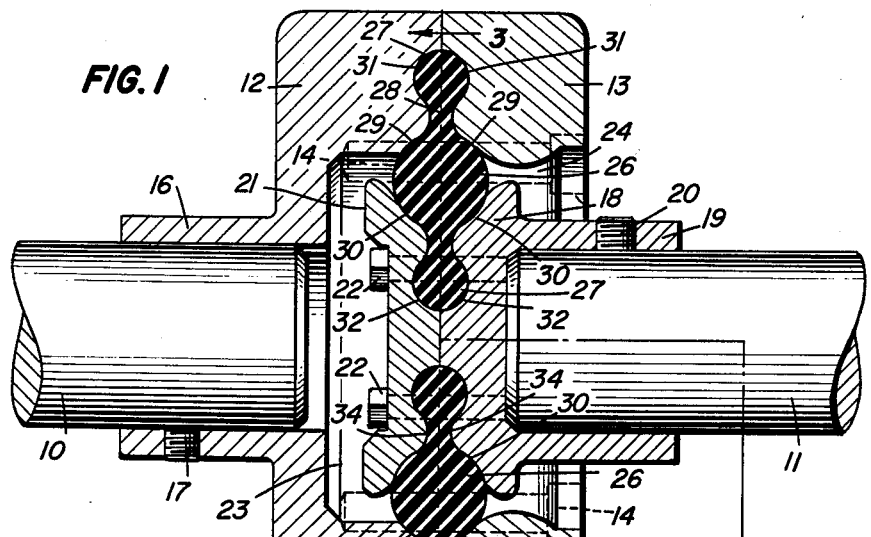
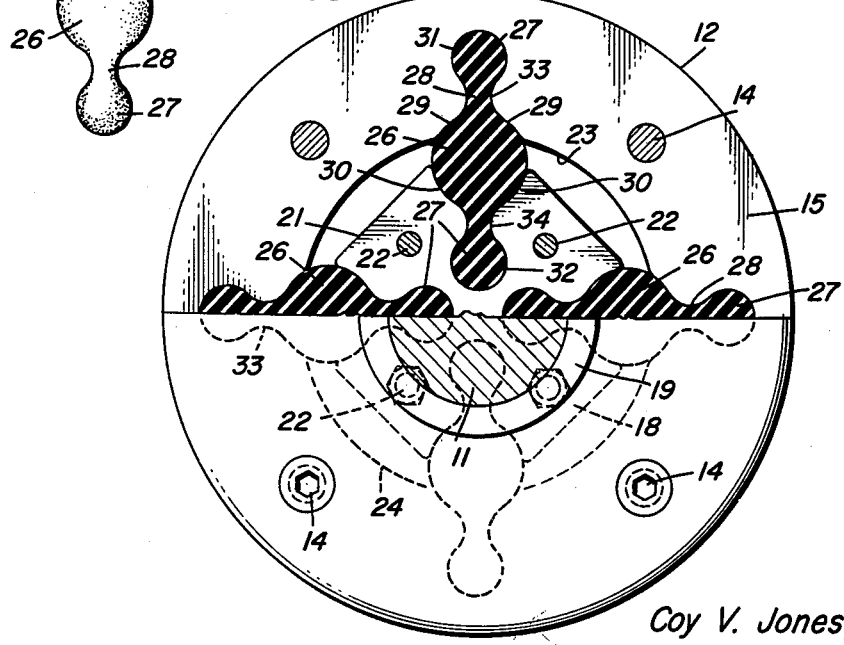
INVENTOR
Coy V. Jones, Sr.
BY B. P. Fishburne, Jr.
ATTORNEY 3,074,254
RESILIENT SHAFT COUPLING
Coy V. Jones, Sr., Greenville, S.C., assignor to Southern Machinery Company, Greenville, S.C., a corporation of South Carolina
Filed June 8, 1961, Ser. No. 115,646
4 Claims. (Cl. 64—11)

This invention relates to a resilient coupling for shafts and the like.

An object of the invention is to provide a simplified, compact, efficient and relatively inexpensive resilient coupling for rotary shaft sections, line shafts and the like, enabling one shaft section to transmit torque or power to the other shaft section, while permitting a degree of relative axial, radial and rotational movement between the two shaft sections.

Another object of the invention is to provide a resilient shaft coupling which is silent in operation and which allows limited universal movement between the two shafts while cushioning the same and reducing vibration to a minimum.

Another object is to provide a resilient shaft coupling utilizing novel resilient connectors which are active in both compression and tension for transmitting torque from a first shaft to a second shaft with which the coupling is employed.

Other objects and advantages of the invention will be apparent during the course of the following description.

In the accompanying drawings forming a part of this application and in which like numerals are employed to designate like parts throughout the same, FIGURE 1 is a central vertical longitudinal section through a resilient shaft coupling embodying the present invention, FIGURE 2 is a side elevation of a resilient element employed in the coupling, FIGURE 3 is a vertical section taken on line 3—3 of FIGURE 1.

In the drawings, wherein for the purpose of illustration is shown a preferred embodiment of the invention, the numerals 10 and 11 designate a pair of shafts or shaft sections which may be mounted for rotation, and one shaft 10 or 11 may be a driving shaft and the other one a driven shaft, for example.

The coupling for the shafts 10 and 11 according to the invention comprises a first outer housing section 12 and a second or companion outer housing section 13, detachably rigidly secured together in abutting axial relation by means of circumferentially spaced screws 14, or the like. The meeting faces 15 of housing sections 12 and 13 are flat and normal to the common longitudinal axis of the shafts 10 and 11. The housing section 12 has a central axial sleeve extension 16 integral therewith, and detachably rigidly secured to the shaft 10 as at 17, by a set screw, key, splines or the like.

A first inner housing section 18 carries a central axial integral sleeve extension 19, secured rigidly and detachably to the shaft 11 and 20, by a set screw, key, spline means or the like. A second or companion inner housing section 21 is arranged in axially opposed abutting relation to the housing section 18, and detachably secured thereto by circumferentially spaced screw means 22, as shown in the drawings.

The outer housing section 12 has a main recess or bore 23 and the outer housing section 13 is substantially annular and has a bore 24. The bores 23 and 24 of the outer housing sections constitute a chamber receiving the inner housing sections 18 and 21 and a portion of the shaft 11, as shown. The housing sections 18 and 21 are disposed centrally within the bores 23 and 24, or chamber, with considerable clearance to allow relative axial, radial and rotational movement between the shafts 10 and 11.

A plurality, such as four, circumferentially equidistantly spaced resilient connector elements 25, formed of rubber or rubber-like material, constitute the sole power transmitting connection between the two shafts 10 and 11, in conjunction with the inner and outer housing sections already described. Each resilient connector 25 has an intermediate relatively large preferably spherical or ball-like body portion 26 and inner and outer relatively small preferably spherical extensions or heads 27, connected with the central body portion 26 by somewhat reduced integral necks 28 which are preferably circular in cross section.

The central spherical body portions 26 of the several resilient connectors 25 are seated within complementary spherically formed recess portions 29 and 30, formed respectively in the bores of outer housing sections 12 and 13 and in the exterior faces of the inner housing sections 18 and 21. As shown in FIGURE 3, the inner housing sections 18 and 21 may be rectangular in transverse cross section, whereas the outer housing sections 12 and 13 are annular as shown.

The heads 27 of the resilient connectors 25 are likewise seated within complementary spherically formed recesses 31 and 32 of the outer and inner housing sections respectively, and the reduced necks 28 are disposed within complementary radial neck passages 33 and 34 of the outer and inner housing sections 12 and 13 and 18 and 21, as illustrated.

The resilient connector elements 25 are engaged snugly or clampingly within the recess means of the outer and inner housing sections when the screw means 14 and 22 are drawn up tightly in assembly and the meeting faces of the outer and inner housing sections are in abutting relation. It is preferred that when the parts are thus assembled, there be no clearance or play between the connector elements 25 and the clamping recess means of the inner and outer housing sections which contain the connector elements. The several connectors 25 are thus disposed entirely inside of the outer housing composed of the sections 12 and 13, so that the connectors are substantially enclosed and protected. As should now be obvious, the connectors 25 resiliently couple the two shafts 10 and 11, so that the same may have limited relative movement universally, which includes radially, axially and rotationally.

In operation, assuming that power is applied to the shaft 10, such power or torque is transmitted to the shaft 11 in a smooth and silent manner and without vibration through the several resilient connectors 25 and associated elements. These connectors maintain the inner housing sections 18 and 21 substantially centered within the bores of the outer housing sections but permit of the mentioned relative movement between the two shafts and their housing means.

The central or intermediate spherically formed body portions 26 of the resilient connectors bear most of the load and forces to be resisted, and resiliently absorb radial and axial thrust loads largely through compression or a combination of compression and shearing stress. The resilient ball-like body portions 26 resist by compression combinations of axial and radial loads or stresses placed upon the coupling assembly. In the transmission of rotational torque between the shafts 10 and 11, and also to permit limited angular movement between the two shafts, the necks 28 of the connectors may twist and/or stretch, and thereby supplement and increase the ability of the body portions 26 to absorb the various combinations of forces which must be resisted and transmitted by the shaft coupling. The heads 27 are clamped tightly in place in the recesses 31 and 32 at all times, and thereby stabilize or hold the necks 28 and generally serve to anchor and properly position the elements 25 within the assembly.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A shaft coupling comprising interfitting inner and outer housings for attachment to a pair of separate axially disposed shafts, the outer housing having a bore provided with circumferentially spaced main spherically formed recesses and radial passages leading outwardly from said recesses, the inner housing having complementary main spherically formed recesses in its exterior faces and radial passages extending inwardly thereof, and resilient connector elements of rubber-like material between said inner and outer housings and including intermediate spherically formed body portions seated within said recesses and radially extending reduced portions anchored within said passages, whereby said coupling may transmit torque from one shaft to the other shaft while simultaneously allowing universal relative movements between said shafts.

2. The invention as defined by claim 1, and wherein said inner and outer housings are split to form opposed abutting housing sections, and axial fastener means engaging said housing sections to detachably secure them together clampingly with said resilient connector elements.

3. A resilient shaft coupling comprising first and second outer substantially tubular housing sections arranged in axial abutting relation, screw means detachably securing said outer housing sections together in said abutting relation, means to secure one of said outer housing sections to a first shaft to move therewith, first and second inner housing sections disposed within the bore of the outer housing sections and spaced therefrom and arranged in axially opposed abutting relation, screw means for detachably securing said inner housing sections together in said abutting relation, means to secure one of said inner housing sections to a second shaft for movement therewith, said outer and inner housing sections having radially opposed main substantially spherically formed complementary recesses and substantially radial passages leading from said recesses, and a corresponding number of rubber-like connector elements for said outer and inner housing sections including main relatively large substantially spherically formed compressible body portions seated within said complementary recesses and reduced radial neck portions clampingly held within said radial passages on diametrically opposite sides of said body portions.

4. A resilient shaft coupling comprising telescopically interfitting inner and outer housing parts for attachment to a pair of power transmitting shafts, said inner housing part provided exteriorly with a plurality of circumferentially spaced relatively large main recesses, radially inwardly extending reduced neck passages leading from the bottoms of the main recesses and relatively small secondary recesses of greater width than the neck passages arranged radially inwardly of the latter and communicating therewith, said outer housing part being provided internally with a plurality of circumferentially spaced relatively large main recesses, radially outwardly extending reduced neck passages leading from the bottoms of the main recesses and relatively small secondary recesses of greater width than the neck passages arranged radially outwardly of the latter and communicating therewith, said main recesses, neck passages and secondary recesses of the inner and outer housing parts adapted for alignment radially, and a corresponding number of resilient separately formed connector elements interposed between the inner and outer housing parts and resiliently interconnecting the same and having relatively large intermediate compressible body portions seated within said main recesses, reduced radial neck portions extending upon opposite sides of said body portions and extending through said neck passages and being stretchable and relatively small head portions connected with the neck portions and being of greater width than the neck portions and disposed snugly within said secondary recesses.

References Cited in the file of this patent

FOREIGN PATENTS

| | | |
|---|---|---|
| 557,133 | Great Britain | Nov. 5, 1943 |
| 984,089 | France | Feb. 21, 1951 |
| 1,198,842 | France | June 15, 1959 |